US012682614B2

(12) United States Patent
Amthor et al.

(10) Patent No.: US 12,682,614 B2
(45) Date of Patent: Jul. 14, 2026

(54) MICROSCOPY SYSTEM AND METHOD FOR CALCULATING A RESULT IMAGE USING AN ORDINAL CLASSIFICATION MODEL

(71) Applicant: Carl Zeiss Microscopy GmbH, Jena (DE)

(72) Inventors: Manuel Amthor, Jena (DE); Daniel Haase, Zoellnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 229 days.

(21) Appl. No.: 18/405,557

(22) Filed: Jan. 5, 2024

(65) Prior Publication Data

US 2024/0233341 A1    Jul. 11, 2024

(30) Foreign Application Priority Data

Jan. 10, 2023    (DE) ..................... 10 2023 100 439.5

(51) Int. Cl.
G06V 10/774        (2022.01)
G06T 5/50          (2006.01)
(Continued)

(52) U.S. Cl.
CPC .............. G06V 10/774 (2022.01); G06T 5/50 (2013.01); G06T 5/70 (2024.01); G06T 7/10 (2017.01);
(Continued)

(58) Field of Classification Search
CPC .... G06V 10/774; G06V 10/82; G06V 20/698; G06V 20/70; G06V 10/764;
(Continued)

(56) References Cited

U.S. PATENT DOCUMENTS 9,971,966 B2     5/2018  Nelson et al.
11,508,045 B1 *  11/2022  Amthor ..................... G06T 5/94
(Continued)

FOREIGN PATENT DOCUMENTS

DE     10 2019 114 459 A1     12/2019
DE     10 2021 100 444 A1     7/2022
(Continued)

OTHER PUBLICATIONS

Search Report for German Application No. 10 2023 100 439.5, Nov. 2, 2023, 8 pages.
(Continued)

*Primary Examiner* — Ming Y Hon
(74) *Attorney, Agent, or Firm* — LaBatt, LLC

(57)        ABSTRACT

A microscopy system forms a result image from a microscope image using an ordinal classification model. The ordinal classification model comprises classifiers and is defined by a training designed as follows: predetermined microscope images are input into the ordinal classification model in the training; a target image is given for each predetermined microscope image, wherein binary masks are generated from each target image via a comparison with pixel threshold values; the binary masks are used in the training as classification targets of the classifiers. The training of different classifiers differs in the pixel threshold value that is used to generate the classification targets; In the training, discrepancies between the classification masks and the binary masks are reduced. After the training, each classifier calculates a classification mask for a microscope image to be processed; these classification masks are combined into a result image.

20 Claims, 5 Drawing Sheets

(51) Int. Cl.
  G06T 5/70 (2024.01)
  G06T 7/10 (2017.01)
  G06V 10/82 (2022.01)
  G06V 20/69 (2022.01)
  G06V 20/70 (2022.01)

(52) U.S. Cl.
  CPC ............ G06V 10/82 (2022.01); G06V 20/698 (2022.01); G06V 20/70 (2022.01); G06T 2207/10056 (2013.01); G06T 2207/20081 (2013.01); G06T 2207/20084 (2013.01); G06T 2207/20212 (2013.01); G06T 2207/30024 (2013.01)

(58) Field of Classification Search
  CPC .... G06V 10/776; G06V 2201/03; G06T 5/50; G06T 5/70; G06T 7/10; G06T 2207/10056; G06T 2207/20081; G06T 2207/20084; G06T 2207/20212; G06T 2207/30024; G06T 7/0002; G06T 7/0012; G02B 21/008; G02B 21/367; G01N 21/84
  See application file for complete search history.

(56) References Cited

U.S. PATENT DOCUMENTS

| | | | |
|---|---|---|---|
| 2012/0328178 A1* | 12/2012 | Remiszewski .......... | G06T 11/60 382/133 |
| 2018/0247107 A1 | 8/2018 | Murthy et al. | |
| 2020/0253545 A1 | 8/2020 | Nakae et al. | |
| 2021/0142116 A1* | 5/2021 | Jaipuria ................... | G06N 3/08 |
| 2022/0222822 A1 | 7/2022 | Amthor et al. | |
| 2023/0036156 A1* | 2/2023 | Ho ..................... | G01N 21/6428 |
| 2023/0047100 A1* | 2/2023 | Arcadu ................ | G06V 20/695 |
| 2023/0105854 A1* | 4/2023 | Amthor .................... | G06T 3/40 382/224 |
| 2024/0249523 A1* | 7/2024 | Cole ....................... | G06T 7/194 |

FOREIGN PATENT DOCUMENTS

| | | |
|---|---|---|
| DE | 10 2019 114 012 A1 | 12/2022 |
| DE | 10 2021 114 287 A1 | 12/2022 |
| DE | 10 2021 125 576 A1 | 4/2023 |

OTHER PUBLICATIONS

Doan et al., "Sonnet: A Self-Guided Ordinal Regression Neural Network for Segmentation and Classification of Nuclei in Large-Scale Multi-Tissue Histology Images", IEEE Journal of Biomedical and Health Informatics, vol. 26, No. 7, Jul. 2022, pp. 3218-3228.

Ounkomol, et al., "Label-free prediction of three-dimensional fluorescence images from transmitted-light microscopy", Nature Methods, vol. 15, Nov. 2018, pp. 917-920.

Rivenson, et al., "Deep learning microscopy", Optica, Research Article, vol. 4, No. 11, Nov. 2017, pp. 1437-1443.

Ronneberger, et al., "U-Net: Convolutional Networks for Biomedical Image Segmentation", MICCAI 2015, Part III, LNCS 9351, pp. 234-241.

Frank, et al., "A Simple Approach to Ordinal Classification", Conference Paper in Lecture Notes in Computer Science, Aug. 2001, 13 pages.

Zeiss, "Instruction Manual ZEISS AI Sample Finder", www.zeiss.com/microscopy, Jan. 2021, 39 pages.

Search Report for German Application No. 10 2023 100 440.9, Nov. 2, 2023, 8 pages.

Weigert, et al., "Content-Aware Image Restoration: Pushing the Limits of Fluorescence Microscopy", bioRxiv, doi: https://doi.org/10.1101/236463; Jul. 3, 2018, 17 pages.

Falk, et al., "U-Net—Deep Learning for Cell Counting, Detection, and Morphometry", Nature Methods, Jan. 2019; 16(1):67-70. doi: 10.1038/s41592-018-0261-2. Epub Dec. 17, 2018, 14 pages.

Sychra, et al., "Fourier classification images in cardiac nuclear medicine," IEEE Transactions on Medical Imaging, vol. 8, No. 3, pp. 270-275, Sep. 1989.

Office Action for U.S. Appl. No. 18/405,578, May 19, 2026, 15 pages.

* cited by examiner

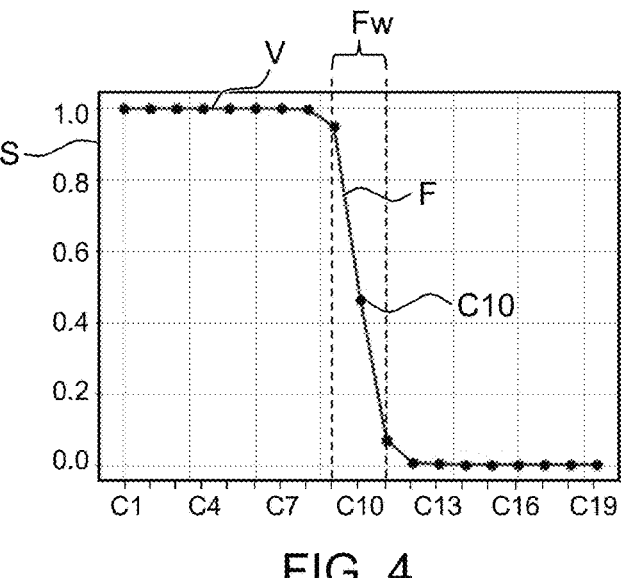
FIG. 4
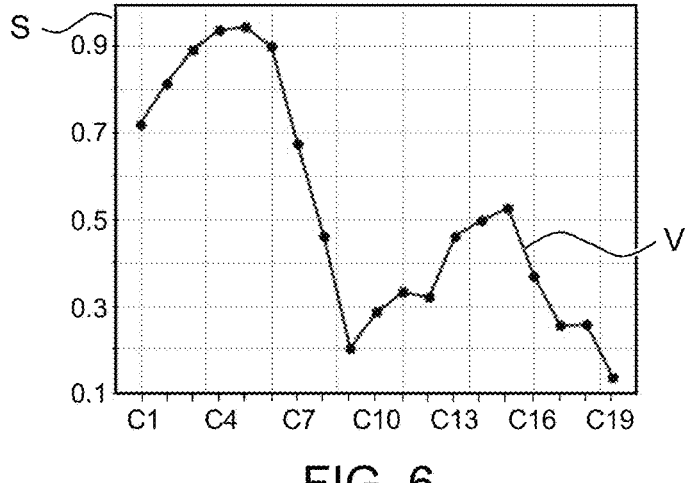
FIG. 5
FIG. 6

MICROSCOPY SYSTEM AND METHOD FOR CALCULATING A RESULT IMAGE USING AN ORDINAL CLASSIFICATION MODEL

REFERENCE TO RELATED APPLICATIONS

The current application claims the benefit of German Patent Application No. 10 2023 100 439.5, filed on Jan. 10, 2023, which is hereby incorporated by reference.

FIELD OF THE DISCLOSURE

The present disclosure relates to a microscopy system and to a method for calculating a result image from a microscope image using an ordinal classification model.

BACKGROUND OF THE DISCLOSURE

The importance of the role of image processing in modern microscopes is continuously increasing. Machine-learned models are being employed on an increasing scale for image-to-image mappings, which generally calculate a result image or a result mask from an input microscope image. It is in particular possible, depending on the design of the machine-learned model, to achieve the following effects and advantages through image-to-image mappings:

an improved image quality, e.g., a higher resolution or less noise. To this end, the model can be trained with training data consisting of pairs of microscope images and target images that are registered in relation to each other, wherein the target images have a higher resolution or a lower noise level than the microscope images.

a preservation of the sample, e.g., due to less laser light being required to illuminate the sample and/or the omission of a previously required special sample preparation. Training data for this purpose can comprise microscope images that have been captured with a relatively low illumination intensity. Microscope images of the same sample regions that have been captured with a different or stronger illumination and/or for which the sample was treated in a special manner are used as target images.

an enhanced representation of structures present in the image, e.g., a virtual staining of predefined structure types. Image pairs that differ in the contrast method (e.g., a phase-contrast image and a fluorescence image of the same sample) and/or in a chemical staining (e.g., images captured before and after a sample is chemically stained) are used as training data.

time savings in the imaging of the sample, e.g., through a coarser scanning or shorter exposure time. Corresponding training data comprises image pairs that differ, e.g., in a scanning resolution or exposure time.

For image-to-image mappings, machine-learned models often comprise a convolutional neural network (CNN) in a U-Net architecture or a variation of the same. Such models are described, e.g., in:

Ounkomol, Chawin, et al., "Label-free prediction of three-dimensional fluorescence images from transmitted light microscopy", Nat Methods. November 2018; 15(11): 917-920. doi:10.1038/s41592-018-0111-2.

Weigert, Martin, et al., "Content-Aware Image Restoration: Pushing the Limits of Fluorescence Microscopy", bioRxiv, doi: https://doi.org/10.1101/236463; 3 Jul. 2018.

Rivenson, Yair, et al., "Deep Learning Microscopy", Optica, 20 Nov. 2017, Vol. 4, No. 11, 1437-1443.

Ronneberger, Olaf, et al., "U-Net: Convolutional Networks for Biomedical Image Segmentation", International Conference on Medical Image Computing and Computer-Assisted Intervention (MICCAI) 18 Nov. 2015, Part III, LNCS 9351, pp. 234-241, 2015; DOI: 10.1007/978-3-319-24574-4_28.

Falk, Thorsten, et al., "U-Net—Deep Learning for Cell Counting, Detection, and Morphometry", Nature Methods, 2019 January; 16(1):67-70. doi: 10.1038/s41592-018-0261-2. Epub 17 Dec. 2018.

A denoising is achieved in the aforementioned article by M. Weigert et al. The learned model generates a result image that has an increased signal-to-noise ratio (SNR) compared to the input microscope image. The aforementioned article by Y. Rivenson describes a model for a super-resolution. Image segmentations are described in the aforementioned article by O. Ronneberger et al. and the article by Th. Falk et al. The aforementioned article by Ounkomol et al. describes a machine-learned model for virtually staining a microscope image.

A U-Net for calculating a detail-reduced contrast image from an input microscope image is known from DE 10 2021 114 287 A1. U.S. Pat. No. 9,971,966 B2 describes a machine-learned image regression model for virtual staining. DE 10 2019 114 459 A1 describes, inter alia, a machine-learned model for so-called compressed sensing: image data is only available for some sample regions and, based on this image data, the model estimates image data for neighboring sample regions that were not imaged.

The aforementioned examples of calculating a result image use models that calculate an image regression. In this case, an output value (e.g. the value of an image pixel) is output as any value within a value range. The value range can run, e.g., from 0 to 255 and can accordingly comprise 256 different brightness levels.

Literature on ordinal classification models with which an estimate of class membership is calculated instead of a regression is listed in the following as background information. Ordinal classification models are used for a classification when the possible classes form a logical order. Classes in an order can indicate, e.g., the size of an object of interest in a microscope image. In order to take a class order into account in an ordinal classification, special auxiliary classes can be employed, as described in: Frank, Eibe und Hall, Mark, "A Simple Approach to Ordinal Classification", Conference Paper in Lecture Notes in Computer Science, August 2001, DOI: 10.1007/3-540-44795-4_13. Special ordinal classification models for processing microscope images have also been described by the Applicant in the German patent application DE 10 2021 125 576 filed on Oct. 1, 2021. This document discloses the use of auxiliary classes containing different numbers of the classes that follow each other according to the order. For example, the first auxiliary class can comprise all classes except for the first class, the second auxiliary class can comprise all classes except for the first two classes, a third auxiliary class can comprise all classes except for the first three classes, etc. The binary classifiers of the ordinal classification model respectively indicate an estimate of the membership of an input microscope image in the corresponding auxiliary class.

Regression models and classification models generally use different optimizers and different metrics in the loss function to be optimized in the training. A regression model can use, e.g., a regression metric such as an L1 loss or an L2 loss, while with ordinal classification models a classification metric can be used, such as, e.g., a binary cross-entropy loss. The optimizer determines how model parameter values are modified to minimize the loss function and has a large impact on the resulting model quality or training time. In particular the Adam optimizer is used with regression models (see, e.g., the aforementioned article by Ounkomol et al.); however, compared to a standard optimizer such as the SGD optimizer (SGD: stochastic gradient descent), which is employed in particular with classification models, an Adam optimizer often finds a poorer solution and leads to a lower generalizability.

SUMMARY OF THE DISCLOSURE

It can be considered an object of the invention to indicate a microscopy system and a method which calculate a result image from a microscope image with a high processing quality.

This object is achieved by the microscopy system and the method with the features of the independent claims.

A microscopy system according to the invention for forming a result image from a microscope image using an ordinal classification model comprises a microscope and a computing device. A microscope image to be processed is captured with the microscope and subsequently processed by the computing device. The computing device includes an ordinal classification model that comprises a plurality of classifiers and that is defined by a training designed as follows: • given/predetermined microscope images are input into the ordinal classification model in the training; • a target image is given/predetermined for each predetermined microscope image, wherein a plurality of binary masks are generated from each target image via a comparison with different pixel threshold values; • the binary masks generated from the target images by means of the same pixel threshold value are used in the training as classification targets of one of the classifiers. The training of different classifiers thus differs in the pixel threshold value that is used to generate the associated classification targets; • in the training of one of the classifiers, discrepancies between classification masks calculated by the classifier from predetermined microscope images and the binary masks used as classification targets are reduced. The computing device is configured to input a microscope image to be processed into the ordinal classification model after completion of the training, wherein each classifier calculates a classification mask for the input microscope image. The computing device is also configured to combine the classification masks calculated by the classifiers for the same microscope image to be processed into a result image.

A computer-implemented method according to the invention calculates a result image from a microscope image using an ordinal classification model. The ordinal classification model comprises a plurality of classifiers and is defined by a training designed as follows: • predetermined microscope images are input into the ordinal classification model in the training; • a target image is predetermined for each predetermined microscope image, wherein a plurality of binary masks are generated from each target image via a comparison with different pixel threshold values; • the binary masks generated from the target images by means of the same pixel threshold value are used in the training as classification targets of one of the classifiers, whereby the training of different classifiers differs in the pixel threshold value that is used to generate the associated classification targets; • in the training of one of the classifiers, discrepancies between classification masks calculated by the classifier from input microscope images and the binary masks used as classification targets are reduced or minimized. After completion of the training, a microscope image to be processed is input into the ordinal classification model and each classifier calculates a classification mask for the input microscope image. The classification masks calculated by the classifiers for the same microscope image are combined into a result image.

The invention also relates to a computer program that can be stored on a non-volatile computer-readable medium and that comprises commands which, when the program is executed by a computer, cause the computer to carry out the method according to the invention.

The invention enables an image-to-image mapping that utilizes ordinal classification results instead of an image regression in order to calculate pixel values. The employed model can in particular use the U-Net architecture proven by regression models, wherein the conventional final step of regression is replaced by a plurality of classification calculations. The output layer of a conventional image regression model, which generates a continuous mapping by means of a pixelwise linear combination of the penultimate intermediate output layer of the model, can thus be replaced by a pixelwise ordinal classification layer.

Output values in the result image can be, e.g., grey values from 0 to 255 and lie on an ordinal scale. It is thus possible to use an ordinal classification model that explicitly utilizes the ordinal character of the output values. The utilization of this ordinal character can yield a stabler, more robust training. In addition, less training data is required. Uncertain predictions can be detected relatively easily, e.g., by calculating confidences or confidence intervals. This permits a better detection of prediction issues in the processing of microscope images not seen in the training.

Optional Embodiments

Variants of the microscopy system according to the invention and of the method according to the invention are the object of the dependent claims and are explained in the following description.

Classification Masks and Binary Masks in the Training of the Ordinal Classification Model In the training of a conventional regression model for image-to-image mapping, discrepancies between an output image calculated by the model and a predetermined target image are captured in a loss function. The output image and the target image contain a plurality of pixels, e.g. 256×256 pixels, the possible values of which lie in a broad range, e.g., in the value range 0 to 255 or broader. In contrast, in the training of the ordinal classification model, discrepancies between a classification mask calculated by a classifier and a binary mask posited as true ("ground truth") can be captured in the loss function.

A classification mask indicates a class membership or a probability of a class membership per pixel. A class membership is indicated by two different values, e.g. 0 and 1, so that the output possibilities are limited to these two values. In cases where a classification probability is output, the possible values lie in a range of, e.g., 0 to 1 (or in a value range to be mapped to this value range), wherein the maximum value and the minimum value designate the respective cases in which the corresponding class is present with certainty or is not present with certainty.

Training data for a training of the ordinal classification model comprises a plurality of microscope images and target images. Pairs consisting of a microscope image and a target image can be registered, i.e., a sample point has the same image coordinates in both images. Each pixel of one of the target images is compared to different pixel threshold values in order to assign different classifications to the pixel depending on whether the value of the pixel exceeds or falls below the respective pixel threshold values. A binary mask is generated from a target image in this manner for each pixel threshold value. A binary mask thereby indicates for each pixel of the target image whether or not a value of this pixel exceeds the pixel threshold value used to calculate this binary mask. The number of binary masks generated per target image is equal to the number of pixel threshold values used. The number of pixel threshold values is greater than or equal to two and can in principle be chosen freely, for example so as to be equal to or one less than the desired number of different pixel values in the result image.

Design of the Ordinal Classification Model

The ordinal classification model comprises a plurality of classifiers. Each classifier calculates a classification mask from a microscope image input into the ordinal classification model. A classifier can be designed to estimate a membership for just one class and is thus also called a binary classifier or single classifier in the present disclosure.

The classifiers can form a final layer (output layer) of the ordinal classification model; the outputs of the ordinal classification model are thus the classification masks. The ordinal classification model can comprise a neural network, in particular a convolutional neural network such as a U-Net. A U-Net or U-Network denotes a convolutional neural network with a contracting path and a subsequent expanding path. Computations are carried out in the contracting path by means of which a number of image pixels per channel decreases (e.g. via a max-pooling operation); image convolutions are also carried out with filters with a gradually increasing number of channels, so that a number of image channels increases. In contrast, in the expanding path, the number of image pixels is increased again and the number of channels is reduced. Such a U-Net can form a first network section of the ordinal classification model and is followed directly by the classifiers. Alternatively, multiple "heads"—i.e., different processing paths for the output of the first network section before the output is fed to the classifiers in processed form—can be added between the first network section and the classifiers. Alternatively, each classifier can also form a completely separate neural network while a common network section for all classifiers does not exist. The ordinal classification model is generally not limited to neural networks or U-Nets. Rather, any image-to-image regression model can be varied by replacing the last model layer with the described classifiers in order to form an ordinal classification model. In particular, the ordinal classification model or a first network section of the ordinal classification model can be formed by a generator of a GAN (generative adversarial network), e.g. a StyleGAN. A virtual staining application can thus build on the generator of a conventional GAN used for this purpose, wherein the output layer of the generator is replaced by the described ordinal classification layer.

In cases where each classifier receives the output of the first network segment, i.e. a multi-channel output or an output in principle comprising any number of dimensions, each classifier can be designed to calculate a classification mask in the form of a linear combination from the output of the first network segment. After the training of the ordinal classification model and classifiers, the classifiers differ in how the respective linear combination is formed. Otherwise, the classifiers can be formed identically. It is also possible, however, to add further processing steps, e.g. activation functions such as a sigmoid, tanh or ReLU function.

It can be provided that solely the binary masks generated from the target images are used in the training of the ordinal classification model, but not the target images themselves. That is, in the loss function that is minimized in the training, discrepancies of the model outputs are calculated with respect to the binary masks and not with respect to the target images in order to determine changes in the model parameter values, which is described in greater detail later on.

Application Areas of the Ordinal Classification Model

The ordinal classification model is used for an image-to-image transformation in which at least one microscope image is input. An output of the ordinal classification model is classification masks from which a result image is calculated or the result image itself.

In particular, the ordinal classification model can be used to calculate a result image in the form of at least one of the following from at least one input microscope image:

a result image/output image in which depicted objects are more clearly visible or are depicted in a higher image quality compared to the input microscope image or in which a depiction of certain structures is suppressed. The improved visibility or higher image quality can generally relate to depicted objects, as, e.g., in the case of a noise reduction (denoising), resolution enhancement (super-resolution), contrast enhancement (e.g. an adjustment of the gamma value or a contrast spread) or deconvolution. The improved visibility can also relate solely to specific objects, however, as in the case of a transformation between different contrast types whereby a virtual staining of specific structures is achieved. A suppression of structures can occur, e.g., via an artefact removal or via a detail reduction of a background. The artefact reduction does not necessarily have to relate to artefacts already present in captured raw data, but can also relate to artefacts first caused by an image processing, in particular in the case of a model compression. A model compression simplifies a machine-learned model in order to reduce the memory or computational requirements of the model, wherein due to the model compression the model accuracy can be slightly reduced and artefacts can occur. An image-to-image transformation for calculating the output image can also relate to a filling-in of image regions (inpainting), e.g., a filling-in of defects or gaps as a function of surrounding image content. The output image can also be a density map of depicted objects, e.g., by marking cell or object centers. It is also possible for a white balance, an HDR image or a de-vignetting to be calculated. A white balance removes a distorting hue from the input microscope image so that colorless objects are actually depicted as colorless in the output image. In an HDR image, a scale of possible brightness differences per color channel is increased in relation to the input microscope image. De-vignetting removes an edge shading of the input microscope image or generally also other effects that increase towards the image edge, such as a change in color, errors in depiction or a loss in image sharpness. A signal separation ("unmixing") is also possible in which one or more signal components are extracted, e.g. in order to estimate an extraction of a spectral range from a captured image.

a virtually stained image, to which end the predetermined microscope images of the training are captured with a different contrast type than the target images. For example, the transformation can occur between the contrast types bright-field and DIC (differential interference contrast) or in order to calculate a fluorescence image from a bright-field image. Alternatively or in addition to a employed contrast type, a microscope image and a target image can also differ in a chemical staining.

a resolution enhancement (super-resolution) of the input microscope image, to which end the target images have a higher resolution than the predetermined microscope images in the training.

a denoising of the input microscope image, to which end the target images have a lower image noise level than the predetermined microscope images in the training.

a result image in which sample regions that were not captured in the input microscope image are added based on neighboring captured sample regions in the input microscope image (compressed sensing).

a deconvolution of the input microscope image, to which end the target images are a deconvolved version of the predetermined microscope images in the training.

a semantic segmentation mask with ordinal classes: The ordinal classification model is not only suitable for the aforementioned examples in which the ordinal classes are derived from the brightness values of pixels. It is also suitable for semantic segmentations with three or more ordinal classes. The predetermined target images of the training are semantic segmentations that indicate for each pixel a membership in one of the ordinal classes based on the corresponding pixel value. The ordinal classes can designate, for example, a local defocus, an image quality, a noise level, a degree of contamination, a sample-vessel fill level, object sizes or heights of depicted objects. A classification occurs pixelwise or by region, whereby for each pixel or image region of an input microscope image the associated class is predicted. For example, four classes of a semantic segmentation can indicate a low/medium/high/very high degree of contamination (or alternatively: noise level, etc.). A target image of the training data is thus a semantic segmentation mask in which each pixel indicates one of the four aforementioned classes by its value. By means of a comparison with three pixel threshold values, three binary masks are generated from this semantic segmentation mask, which respectively indicate whether the degree of contamination is >low or >medium or >high. Three classifiers are trained with such binary masks. The classifiers respectively calculate a classification mask, which are in turn combined into a result image corresponding to the semantic segmentation mask.

Knowledge of a local noise level within a microscope image can be desired for analysis purposes or for an evaluation of whether an image section is suitable for a subsequent image processing. It is often not possible to calculate a local noise level from a microscope image by simple means, as it is generally not possible to discriminate unequivocally between cell structures and random noise. The ordinal classification model provides a remedy here. To generate training data, a noisy microscope image and a further (noise-free) microscope image of the same sample region are provided, wherein the noise-free microscope image is captured with a lower noise level and/or is noise-reduced through corrections. By comparing these two images, it is possible to generate a plurality of segmentations with ordinal classes that indicate the noise level relative to the noise-free microscope image.

A defocus can vary across a microscope image, so that the estimation of a local level of defocus per pixel or image region of the microscope image can be useful. A local degree of contamination can also vary within a captured field of view, in particular on a sample carrier. An estimation of sample-vessel fill levels is in particular suitable when the captured microscope image takes the form of an overview image in which a sample carrier with a plurality of sample vessels is visible, e.g., multiple wells of a multiwell plate or chambers of a chamber slide. A classification of object sizes is in particular suitable when it is intended to establish a local size of a plurality of objects depicted in the microscope image, for example the size of biological cells or cell organelles. An estimation of object heights can be desired, e.g. for navigation maps, which can serve to prevent a potential collision between a sample and an objective or other microscope components in automated microscopes. An estimation of object heights can be particularly advantageous when analysing rock samples or electronic components.

Result images can be analysed in an automated manner for further applications, for example for counting biological cells or other objects or for an estimation of confluence, i.e. for estimating a part of a surface area that is covered by cells.
Detail Reduction/Stylized Representation In the case of a virtual staining, for example, there is in principle the risk that sample structures that are not present in the microscope image are added by the employed machine-learned model. It is often sufficient, however, to make a number and position of certain objects in the microscope image more discernible by means of a virtual staining without the need for structural details. In particular in order to prevent the addition of invented structural details in these cases, it is possible to employ a stronger quantization of the target values. A distance between the pixel threshold values is relatively large in this case, whereby accordingly few classifiers are learned. In particular, a number of pixel threshold values and thus a number of binary masks generated from the same target image can lie between 3 and 16, whereby result images calculated from the classification masks of the ordinal classification model are reduced in detail compared to the target images. The possible pixel values of the target images stem from a broader range, which can be, e.g., 8 bit or 16 bit.
Objective Function At least one objective function is optimized in the training of the ordinal classification model. The objective function captures discrepancies between classification masks calculated by the classifiers and associated binary masks generated from the predetermined target images by a threshold value comparison. The binary masks thus constitute classification targets that the calculated classification masks should resemble as closely as possible.

The objective function can be a loss function, which is minimized in the training and which outputs a larger value, the greater the discrepancies between the classification masks and the associated binary masks are. A loss function can, however, also be replaced by a reward function to be maximized. Discrepancies can be detected pixelwise between a classification mask and the associated binary mask or also in an essentially known manner using more complex metrics that take into account, e.g., the shape of an area that belongs together in the classification mask or binary mask.

The optimization of the plurality of classifiers can occur via the same objective function. Alternatively, different objective functions can be used for different classifiers.

Binary masks generated in advance from the target images can be input into the objective function. Alternatively, the binary masks can be calculated from the target images first within the objective function. In this case, a target image is input into the objective function, but it is not the discrepancy between a classification mask and the target image that is captured, but rather the discrepancy between the classification mask and a binary mask derived from the target image.

In a training step, one or more microscope images are input into the ordinal classification model and an adjustment of the model parameter values of the ordinal classification model is calculated based on the discrepancies captured in the objective function/loss function. The classification masks of a plurality of or of all classifiers can be entered in a single training step into a common loss function, i.e. a common loss is calculated. For the adjustment of model parameters, however, only the error originating from each classifier is fed back to that classifier. The error is relayed further via backpropagation back to the shared first network section, which can be formed, e.g., by the contracting and subsequently expanding path of a U-Net.

Alternatively to this common training of all classifiers, it is also possible for the classifiers to be trained alternately. In a training step, solely classification masks of a single classifier enter the loss function, whereupon only the model parameter values of this classifier and the previous network section are adjusted, while the remaining binary classifiers are kept constant. The classifiers are thus trained in turns.

Weighting Mask

One or more weighting masks can be used in the objective function in order to weight discrepancies between the classification masks and binary masks. The weighting mask thus assigns a respective weight to each pixel or to different image regions.

In particular, a weighting mask can be calculated for each binary mask by selecting a weight in the weighting mask that is greater, the further away a pixel value of the target image from which the binary mask was calculated is from the pixel threshold value used to calculate the binary mask. It is thereby taken into account that a classifier should perform a correct classification with certainty for an image point/pixel whose value in the target image deviates considerably from the pixel threshold value of the classifier and that an error in this case is deemed more serious. Erroneous classifications close to the pixel threshold value, on the other hand, are given a lower weight, as they can also be caused, e.g., by image noise and do not necessarily indicate a weakness of the classifier that requires correction.

For image regions of the target image in which no objects are located or which are located at a minimum distance from certain objects, a weighting can be reduced or set to zero. Alternatively or additionally, it is possible to increase a weighting of image regions for which a qualitatively inadequate image processing has been established.

Pixels around object centers can be given a stronger weighting than pixels further away from the object centers. The object centers can have been identified in advance using the microscope images and/or target images. A correspondingly formed weighting mask applies to a specific target image or all binary masks generated from this target image.

Classes and Inverse Classes

Based on an input microscope image, each binary classifier evaluates whether a certain class applies to a certain image pixel in a result image to be generated or in the classification mask output by the classifier. In this context, a class designates an interval of pixel values for the result image. The interval runs from a minimum possible pixel value up (or alternatively from a maximum possible pixel value down) to the pixel threshold value of the classifier.

For the stability and robustness of the model, it is relevant that the classes for which the classifiers estimate the respective membership do not indicate a single pixel value, but rather intervals of pixel values. Different classes differ in the pixel threshold value, but correspond in the other end of the interval, so that a plurality of or all classes start from the same minimum possible pixel value (or alternatively from the same maximum possible pixel value).

While the classes that can be discriminated by the classifiers relate to pixel intervals, other classes are indicated in result images or target images, namely concrete pixel values. To discriminate between these classes conceptually, the classes discriminated by the classifiers can also be called auxiliary classes. From the classifications into auxiliary classes, it is possible to calculate for each pixel a classification into one of the classes that indicate concrete pixel values. The number of pixel threshold values or auxiliary classes can be selected to be one less than the number of classes indicating a concrete pixel value that are to be discriminated. For example, the two pixel-threshold-value comparisons ">0" and ">1" can be utilized if it is intended to discriminate the three classes pixel value="0", "1" or "2".

It is optionally possible to also use, in addition to the described (auxiliary) classes, inverse (auxiliary) classes, wherein for each inverse class an associated classifier is added, which is referred to as an inverse classifier for the purposes of conceptual discrimination. The binary masks employed as classification targets for the training of the classifiers are generated via a "greater than" comparison or "greater than/equal to" comparison of the target images with pixel threshold values, so that a class membership of a pixel is affirmed if the pixel value is greater than or greater than/equal to the pixel threshold value. The binary masks employed as classification targets for the training of the inverse classifiers, on the other hand, are generated via a "less than" or "less than/equal to" comparison of the target images with the pixel threshold values. Binary masks for the training of the inverse classifiers can also be generated through inversion of the binary masks for the training of the classifiers. The addition of inverse classes increases the stability of the model training.

Forming a Result Image from Classification Masks

The classification masks calculated by the classifiers for the same microscope image are combined into a result image. The combination can occur pixelwise, that is, locally corresponding pixels of the different classification masks are respectively combined in order to determine a pixel value for the locally corresponding pixel in the result image.

Combining the classification masks can occur by means of a pixelwise addition. A pixel value of a pixel in the result image thus represents the sum of the pixel values of the locally corresponding pixels in the classification masks.

The classification masks can be binary masks with the possible values 1 and 0 that respectively affirm or negate a class membership. For a pixel value of N in the result image, the corresponding pixel must thus have a value of 1 (i.e., must affirm a class membership) in N classification masks.

Alternatively, the classification masks can indicate probability values for a class membership between 0 and 1. This makes it possible to obtain a more precise output. The pixelwise sum of the probability values of the classification masks can result in any decimal number, which is rounded or mapped to a whole pixel value.

The described summation is a specific form of a common decision by all classifiers. Instead of a summation, it would also be possible to determine the last binary classifier that still outputs a 1 (or outputs a probability of class membership of >50%) for each pixel and to use the pixel threshold value (e.g. 112) of this binary classifier as the pixel value in the result image.

Alternatively or in addition to a simple pixelwise addition, a machine-learned model (hereinafter: combination model) can be used to calculate a result image from the classification masks. The combination model can in particular be a single-layer network. Training data of the combination model comprises as input images the classification masks that are calculated from a microscope image by the (in particular ready-trained) ordinal classification model; the target image associated with this microscope image is used as the training target of the combination model. The ready-trained combination model allows a quality of the classifiers to be established: if the combination model gives outputs of a classifier a weaker weighting in the calculation of pixel values of the result image, then a lower quality of this classifier can be inferred.

The training of the combination model can also occur simultaneously with the training of the ordinal classification model, whereby an increase in stability can potentially be achieved.

For the purposes of illustration, different variant embodiments describe the generation of a result image in the form of a greyscale image generated from the classification masks of a plurality of classifiers. The result image can, however, also comprise any number of further channels (color channels). The description of the generation of a greyscale image should be understood in this sense as the generation of the image values of a channel of the result image. Different channels can correspond, e.g., to the red/green/blue channels of typical color images. Alternatively or additionally, a result image can comprise an in principle arbitrary number of fluorescence channels which differ in their excitation and/or detection wavelengths. Separate classifiers are used for each channel of the result image, with separate binary masks being employed for their training. The classifiers of different channels can optionally have the same preceding network section or can differ in a preceding network section. For example, it can be provided that classifiers of different channels have different decoders (e.g., separately trained expanding paths of a U-Net) while sharing the same encoder (e.g., the same contracting/compressing path of a U-Net which precedes the decoder).

Microscope Images and Target Images

In the present disclosure, a microscope image is understood to be image data captured by a microscope, or image data obtained by further processing of raw data captured by a microscope, which is input into the ordinal classification model.

The target image can likewise be image data captured by a microscope or obtained by further processing of raw data captured by a microscope.

A microscope image and a target image can be 2D image data, 3D image stacks or volumetric data, or alternatively time series data for which 2D or 3D image data of the same sample were captured at different points in time. The microscope image and the associated target image do not have to be of the same type. For example, the microscope image can be a 2D image and the target image can be a 3D image stack, so that the ordinal classification model learns to calculate a 3D image stack from an input 2D image.

A microscope image and an associated target image can in particular be obtained by different microscopes, different microscopy techniques or contrast methods, different microscope settings or different sample preparations. Concrete examples of target images are described in the section "Application areas of the ordinal classification model".

The term "microscope image" can be used to denote both a predetermined microscope image used in the training and a microscope image to be processed after the training.

A mask can be understood in the present disclosure as a synonym for an image.

In a simple embodiment, each target image is a greyscale image, wherein different binary masks are formed from each target image via the comparison with the different pixel threshold values. The result image calculated from the classification masks of the classifiers can accordingly be a greyscale image. However, a target image can also comprise a plurality of channels instead of a single channel. The channels can be color channels and form, for example, an RGB image and/or comprise a plurality of fluorescence channels. A plurality of binary masks can be generated from each channel via a comparison with pixel threshold values and classifiers of the ordinal classification model can be trained with the generated plurality of binary masks. Alternatively, it is possible for the pixel values of a plurality of channels to be combined into a single value and to only then be compared with the pixel threshold values.

It is also possible to use different types of (in particular single-channel) target images in order to generate the training data for classifiers for different channels of a multi-channel result image. For example, different staining techniques can be employed in the sample preparation in order to generate different target images, from which training data for classifiers for different channels of the result image is generated. A channel of the result image (or a first set of RGB channels of the result image) then constitutes a virtual staining according to a first staining technique, while another channel of the result image (or a second set of RGB channels of the result image) constitutes a virtual staining according to a second staining technique.

Confidence of a Pixel Value in the Result Image

For each pixel in the result image, it is possible to calculate a confidence that indicates a reliability of a pixel value of the respective pixel in the result image.

The confidence of a pixel in the result image is calculated based on a consistency of classification estimates for this pixel in the classification masks. The classification estimates indicate estimates of the classifiers regarding whether the pixel threshold value associated with the classifier in question has been exceeded or not. Pixel intervals are defined by the different pixel threshold values, wherein a pixel interval is invariably entirely (and not only partially) comprised by all larger pixel intervals. For example, pixel threshold values can be . . . 32, 33, 34 . . . A pixel interval ">34" lies entirely within the pixel intervals ">33" and ">32". The classification estimates for a pixel are consistent if, in the case where a classifier affirms a class membership of this pixel in its pixel interval, all other classifiers whose pixel intervals contain the pixel interval of the aforementioned classifier also affirm class membership in their respective pixel intervals. For example, there is no consistency if a classifier affirms class membership in the pixel interval ">34" for a pixel, while another classifier negates class membership in the pixel interval ">33" for the same pixel. The more pronounced such inconsistencies are or the more frequently such inconsistencies between the classification estimates occur for a pixel, the lower the confidence is for this pixel in the result image. In other words, the confidence in a pixel value can be determined to be lower, the more pronounced inconsistencies are between the classification estimates of the classifiers for the pixel in question.

The classification estimates of the classifiers for a pixel form a series according to the associated pixel threshold values. A curve of the series of classification estimates for a pixel can be analysed to calculate a confidence. In this case, the classification estimates are preferably indicated as continuous probabilities and not only as binary class information (yes/no or 1/0). Ideally, the curve of the classification estimates should be monotonic and have the form of a point-symmetric sigmoid function. The confidence for a pixel can be determined to be lower, the more the curve deviates from a monotonic curve and/or the more the curve deviates from a point-symmetrical curve and/or the more the curve deviates from a sigmoid function and/or the higher the entropy of the curve is. The information-theoretical entropy is a measure of the disorder of the data points in the curve and is relatively low when the data points lie on the ideal sigmoid function.

The described approach for determining a confidence utilizes the ordinal character of the data, which increases the reliability of the confidence statement. If, on the other hand, the confidence measures commonly used for regression models or "normal" (i.e. non-ordinal) classification models were used, this ordinal character would not be taken into account, which would reduce the validity of the statement.

Confidence masks can be calculated in the inference phase or even during the training. Confidence masks can be employed in the training to identify microscope images or regions of microscope images for which a processing is categorized as qualitatively inadequate, namely when the confidence does not reach a predetermined minimum level. These microscope images or regions are used more frequently or given a greater weight in the training in order to improve the aptitude of the ordinal classification model to process these microscope images correctly.

General Features

Formulations such as "based on", "using" or "as a function of" are intended to be understood as non-exhaustive, so that it is possible for further dependencies to exist. Descriptions in the singular are intended to cover the variants "exactly 1" as well as "at least one". For example, exactly one microscope image can be input into the ordinal classification model or more than one microscope image can be input simultaneously into the ordinal classification model in order to calculate one (or more) result images.

Objects depicted in a microscope image can be a sample or sample parts, e.g., particles, biological cells, cell organelles, viruses, bacteria, or parts of the same. Objects can also be coverslips or other parts of a sample carrier. Instead of the plural form "objects", the described embodiments can also refer to just one object.

A microscopy system denotes an apparatus which comprises at least one computing device and a microscope. The microscope can be a light microscope that includes a system camera and optionally an overview camera. Other types of microscopes, however, are also possible, for example electron microscopes, X-ray microscopes or atomic force microscopes.

The computing device of the microscopy system can be designed in a decentralized manner, be physically part of the microscope or be arranged separately in the vicinity of the microscope or at a location at any distance from the microscope. It can generally be formed by any combination of electronics and software and can comprise in particular a computer, a server, a cloud-based computing system or one or more microprocessors or graphics processors. The computing device can also be configured to control microscope components. A decentralized design of the computing device can be employed in particular when a model is learned by federated learning by means of a plurality of separate devices.

The characteristics of the invention that have been described as additional apparatus features also yield, when implemented as intended, variants of the method according to the invention. Conversely, a microscopy system or in particular the computing device can be configured to carry out the described method variants.

Different descriptions relate to the training of the ordinal classification model. Variants of the method according to the invention result from the inclusion of the implementation of the training as part of the method. Other variants use a ready-trained ordinal classification model generated in advance according to the described training.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components:

FIGS. 4-6 respectively show classification estimates of the classifiers for a pixel, from which a confidence of the pixel value is determined.

DETAILED DESCRIPTION OF EXAMPLE EMBODIMENTS

Different example embodiments are described in the following with reference to the figures.

FIG. 1

Figure 1:
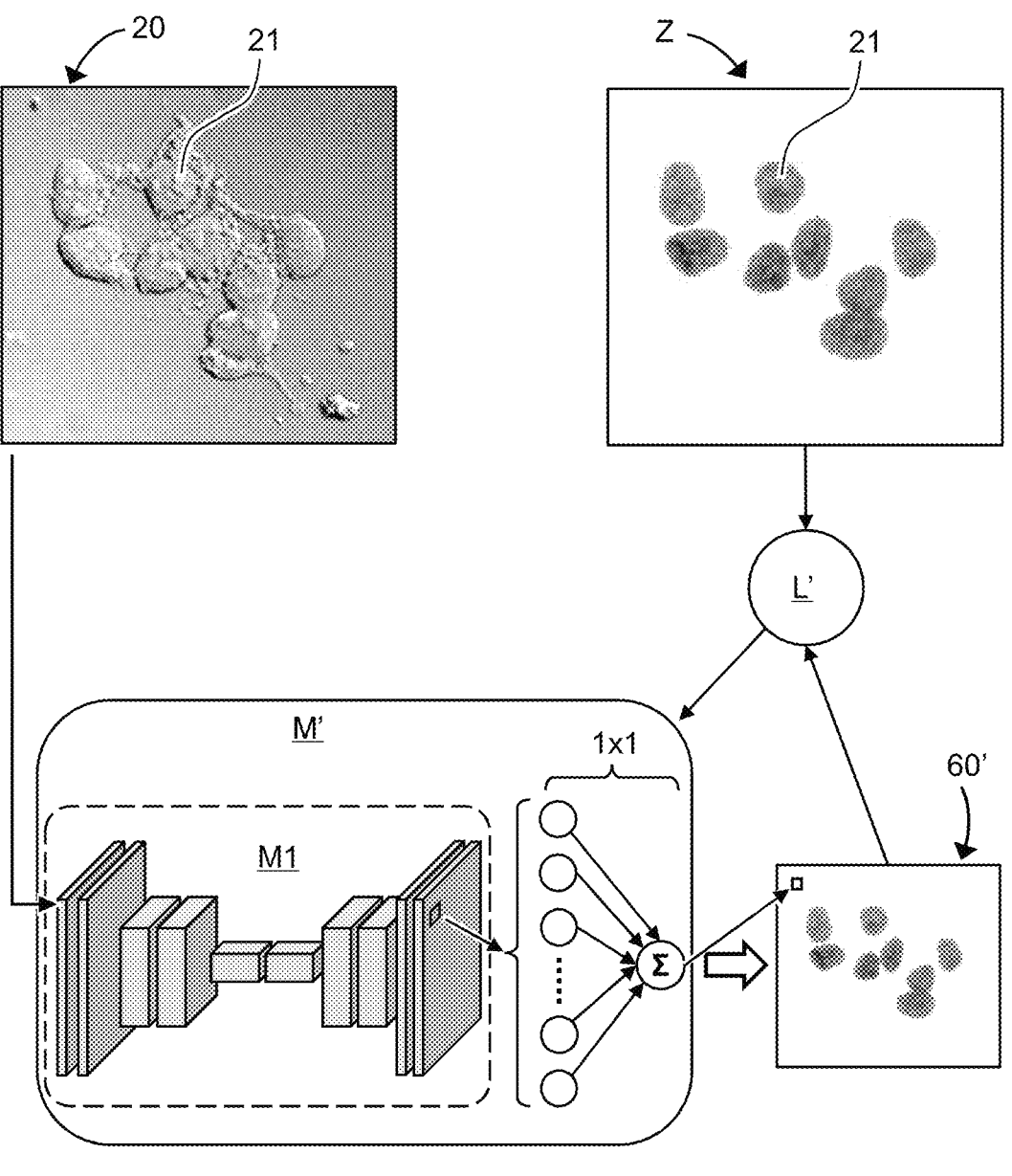
FIG. 1 is a schematic illustration of a training of a machine-learned model of the prior art for an image-to-image mapping.

FIG. 1 schematically shows a training of a conventional machine-learned regression model M' for an image-to-image mapping.

Training data comprises a plurality of given (predetermined) microscope images 20 and associated target images Z. FIG. 1 illustrates one of the predetermined microscope images 20, by way of example a phase-contrast image, and the associated target image Z, which is a fluorescence image in this example.

To improve visibility, the illustration of fluorescence images is inverted in all figures relative to a standard representation (light/dark are reversed). The image contrast in the phase-contrast images and the fluorescence images has also been increased. Incidentally, the images shown can correspond to real images.

The regression model M' is to be trained to calculate a result image from a microscope image that is similar in nature to the target images, i.e. appears to stem from a statistical distribution of the target images. In the illustrated example, the result image is a virtual staining that highlights image regions of samples 21.

In the training, a predetermined microscope image 20 is input into the regression model M', which calculates a result image 60' therefrom. The result image 60' and the target image Z associated with the microscope image 20 are input into an objective function or loss function L', which captures differences between these images. By means of an optimizer, model parameter values of the regression model M' are adjusted in order to minimize the loss function L' iteratively. A result image 60' calculated at the end of the training should thus only deviate negligibly from the associated target image Z.

The regression model M' comprises a first network section M1 with a convolutional neural network (CNN) in a U-Net architecture. The first network section M1 is followed by a final layer of the regression model M'. The output of the first network section M1 thus represents the output of the penultimate layer of the entire regression model M' and is a multi-channel image/tensor, e.g., with the dimensions 256× 256×64, i.e. 64 channels of 2D images with 256 by 256 pixels. The final layer of the regression model M' combines the channels from the multi-channel image in order to output an approximation of the target image as a result image. In the illustrated example, the last layer is a 1×1 convolutional layer for a fully convolutional network, as also described in U.S. Pat. No. 9,971,966 B2 as well as in the article by O. Ronneberger et al. cited in the introduction of this disclosure. A 1×1 filter has a number of channels that corresponds to the number of channels of the input tensor, i.e. 64 in the cited example, so that there is a 1×1×64 convolutional filter here. In the 1×1 convolution, there occurs a pixelwise multiplication of the input tensor by the 1×1 filter; all multiplication results are then added together in order to form a pixel value in the result image. FIG. 1 schematically indicates how the channels of one pixel of the output of the penultimate layer are combined by the 1×1 convolution into a pixel value in the result image 60'. In cases where a single 1×1 filter is used, the output of the final filter layer, i.e. the result image 60', has the size 256×256×1 in the cited example.

The final layer of the regression model M' can be a fully connected layer that implements a linear combination of the penultimate layer outputs.

Allowed values of a pixel in the result image 60' lie in a predetermined range comprising, for example, 256 different values. This permits a greyscale image with 256 different brightness levels to be generated. A difference between the grey value of a pixel of the result image 60' and the grey value of the locally corresponding pixel of the target image Z can be captured in the loss function L'. These are the standard processes for training known image-to-image regression models. The invention differs substantially from the outlined prior art, as explained in the following.

FIG. 2

Figure 2:
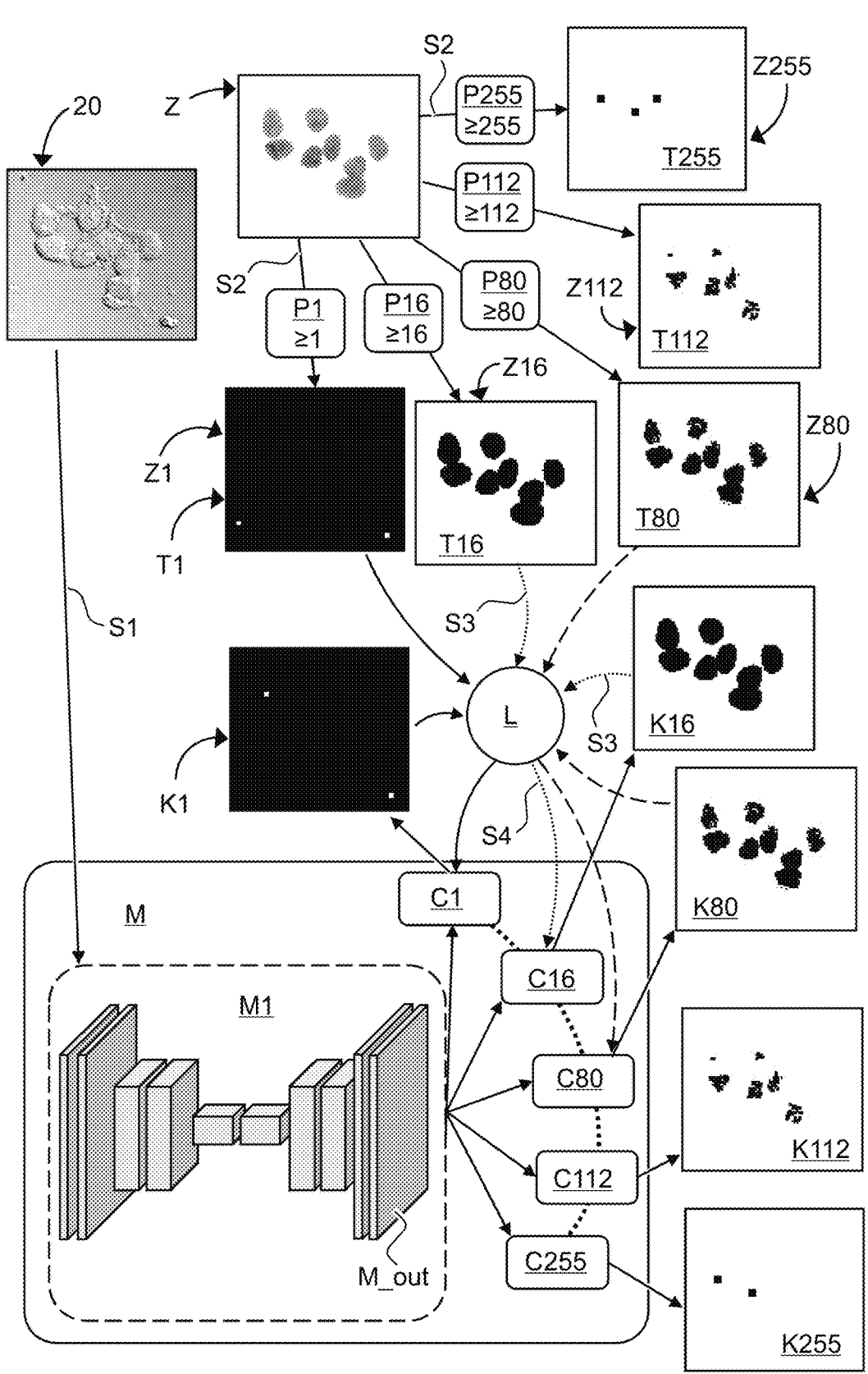
FIG. 2 schematically shows a training of an ordinal classification model for an image-to-image mapping according to example embodiments of the invention.

FIG. 2 schematically shows a training of an ordinal classification model M according to an embodiment example of a method according to the invention.

Training data again comprises a plurality of predetermined microscope images 20 and associated target images Z, which can correspond to the images of FIG. 1. However, the target images Z are not used to detect or minimize discrepancies between the model outputs and pixel values of the target images in a loss function L.

Rather, in a process S2, a plurality of binary masks Z1 to Z255 are first formed from a target image Z via a comparison with different pixel threshold values P1 to P255. For the purposes of clarity, FIG. 2 only shows some of the binary masks Z1 to Z255. Depending on whether a pixel value exceeds or falls below a pixel threshold value P1 to P255, a pixel of the target image Z is assigned a value of 0 or 1 in the associated binary mask Z1 to Z255. The pixel threshold value P16 is, e.g., 16. Every pixel in the target image Z with a value of 16 or more becomes a pixel with a value 1 in the binary mask Z16, while every pixel in the target image Z with a value lower than 16 becomes a pixel with a value 0 in the binary mask Z16. There are consequently only two possible values for each pixel in a binary mask. By way of example, FIG. 2 shows the binary masks Z1, Z16, Z80, Z112 and Z255 calculated respectively with pixel threshold values 1, 16, 80, 112 and 255. Possible pixel values of the target image Z lie here between 0 and 255. The pixel threshold values P1 to P255 are chosen so as to cover the range of the possible pixel values of the target images Z. The binary masks Z1-Z255 indicate class memberships for target value intervals of the pixel values; for example, the binary mask Z80 indicates a class membership for the target value interval≥80. The binary masks Z1-Z255 thus do not indicate class memberships for individual target values (e.g., a pixel value equal to 79, equal to 80, or equal to 81). This is important in order for the binary masks Z1-Z255 to form an order in which each binary mask contains the class memberships of all binary masks of a higher number; for example, the binary mask Z80 contains all class memberships of binary masks calculated with the threshold values≥81 to ≥255 and precisely also the class memberships determined via a comparison with the threshold value 80, i.e. pixels of the target image Z with a value 80. This preserves the ordinal character of the scale of pixel values in the classifications.

The ordinal classification model M comprises a first network section M1, which can be designed as described with reference to FIG. 1 and which can contain a CNN, in particular in the U Net architecture. As the first network section M1 can be configured in a known manner, it is possible to implement the invention in a readily implementable manner as an add-on to essentially all common image-to-image imaging models in the field of microscopy.

The predetermined microscope image 20 is input into the ordinal classification model M, i.e. is input into the first network section M1, and the first network section M1 calculates an output tensor or a multi-channel output M_out therefrom.

The ordinal classification model M comprises a final layer in the form of a plurality of binary classifiers C1 to C255, whereby the ordinal classification model M differs from conventional regression models. Each binary classifier C1 to C255 receives the output tensor M_out of the first network section M1. The classifiers C1 to C255 respectively consist of one layer and calculate a linear combination from the channels of the output tensor M_out. The output of one of the classifiers C1-C255 is a classification mask K1-K255 in which each pixel value indicates a class membership (or a probability of a class membership) of the corresponding pixel. A class membership is indicated in the sense of "yes/no" by two different values, e.g. 0 and 1, so that a classification mask can be a binary mask. If the probability of a class membership is indicated instead, a pixel can have a value in any predetermined interval depending on the desired gradation, wherein the predetermined interval can run from 0 to 1 or can be converted to an interval 0 to 1 in order to be more readily interpretable as a probability.

The binary masks Z1 to Z255 calculated from the target image Z are used as classification targets T1 to T255 in the training of the ordinal classification model M. The binary masks Z1 to Z255 thus enter the loss function L.

The classifiers C1 to C255 differ in the pixel threshold value P1 to P255 that is used to form the associated binary masks Z1 to Z255/classification targets T1 to T255.

For example, the classifier C16 outputs a classification mask K16, which is compared in the loss function L with the binary mask Z16 (process S3). From discrepancies between the classification mask K16 and the binary mask Z16, an optimizer calculates a model parameter adjustment for the classifier C16 (not for the other classifiers), wherein an adjustment of the model parameter values also occurs for the first section M1 by backpropagation, process S4. The procedure is the same for the other classifiers. The adjustment of the model parameter values of one of the classifiers C1 to C255 is thus based solely on the errors of the respective classifier C1 to C255. The ordinal classification model M is adjusted iteratively in this manner so that the outputs of the classifiers C1 to C255 increasingly resemble/replicate the binary masks Z1-Z255.

Each classifier C1 to C255 is assigned a pixel threshold value P1 to P255. The classification mask K1 of the classifier C1 thus indicates for each image pixel a classification of whether the corresponding image pixel is greater than/equal to the pixel threshold value P1. Analogously, each of the remaining classification masks indicates a classification of whether the corresponding image pixel is greater than/equal to the pixel threshold value assigned to the classifier in question.

The classifiers C1-C255 thus constitute single ordinal classifiers with an order based on the order of the pixel threshold values (from P1 to P255 in ascending order or alternatively in descending order).

The training of the classifiers C1-C255 can differ from the training shown in FIG. 1 among other things in the optimizer and in the metric used in the loss function. In the case of FIG. 1, the difference from the locally corresponding ground-truth pixel value of the target image Z is captured using a regression metric (e.g., L1 loss or L2 loss) for each pixel of the predicted result image 60'; by means of a suitable optimizer (e.g. the Adam optimizer), a model parameter adjustment is carried out to minimize the loss function. In contrast, in FIG. 2, the discrepancies in relation to the binary masks Z1-Z255 are captured for each pixel of the outputs of the corresponding binary classifiers C1-C255 using a suitable classification metric (e.g., a binary cross-entropy loss); a model parameter adjustment occurs to minimize the loss function by means of a suitable optimizer such as the SGD optimizer (SGD: stochastic gradient descent).

As described, FIG. 1 and FIG. 2 also differ in the preparation of the training data. In the case of FIG. 1, the loss function captures the discrepancy in relation to pixels of the target image Z, which can have a value in a continuous range. In the case illustrated in FIG. 2, on the other hand, each pixel in the target image Z is assigned a number of N binary class memberships (wherein N is the number of pixel threshold values P1-P255 or classifiers C1-C255), wherein the class memberships indicate whether the continuous target value of the target image Z lies in the value range of the respective ordinal classifier C1-C255.

Figure 3:
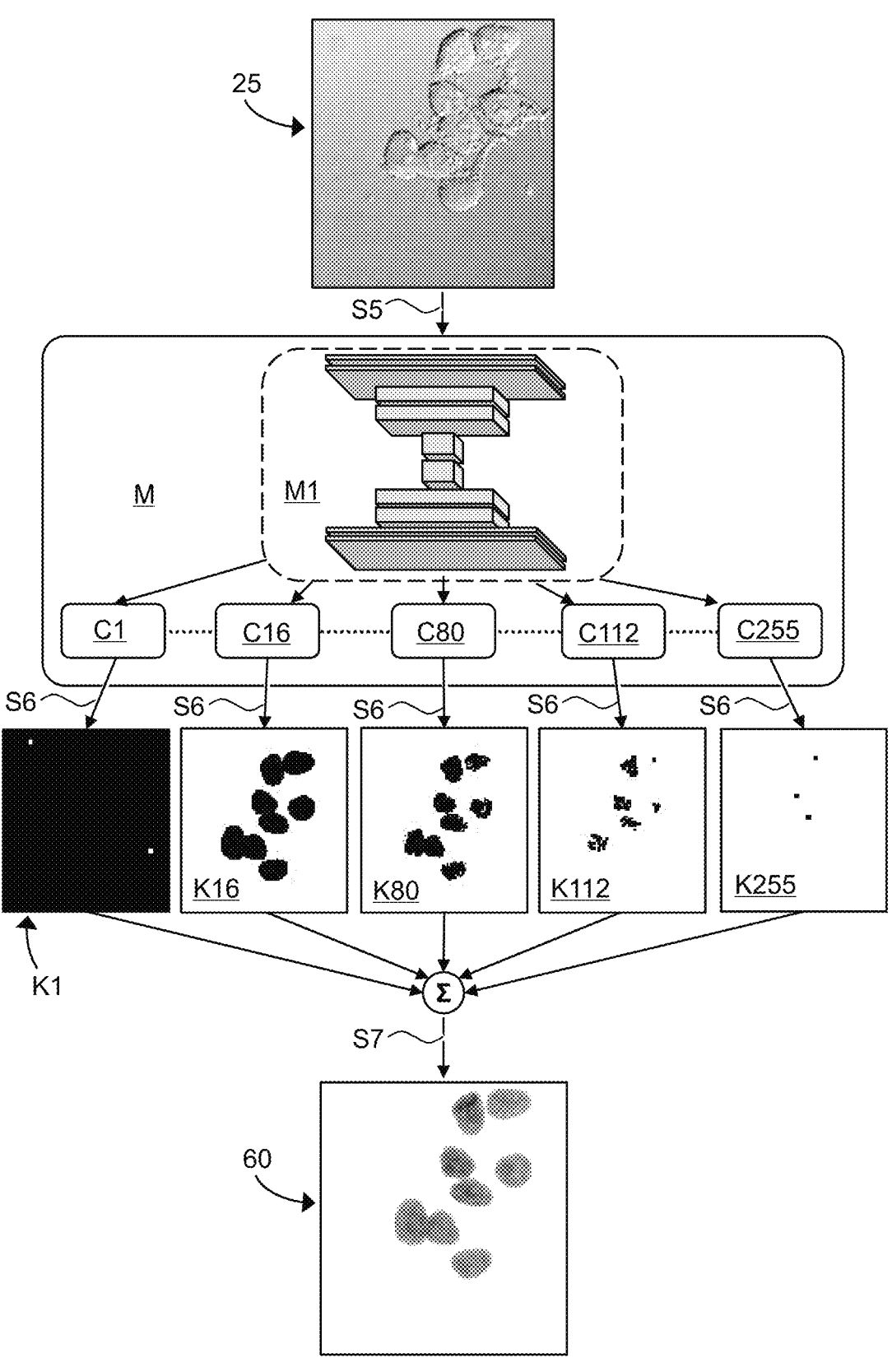
FIG. 3 schematically shows the use of the ordinal classification model of FIG. 2 in the inference phase.

A further difference between the cases illustrated in FIG. 1 and FIG. 2 lies in the fact that, in the conventional approach of FIG. 1, the model output (the result image 60') is already the final desired result, namely an image corresponding to the target images Z, whereas in the case of FIG. 2 a further processing of the model output (of the classification masks K1-K255) is necessary in order to generate an image corresponding to a target image Z. Such a further processing, which is not necessary in the training of the ordinal classification model M, is explained below with reference to the following figure, which shows a use of the ready-trained classification model M in the inference phase. FIG. 3

FIG. 3 shows by way of example the use of the ordinal classification model M from the preceding figure after completion of the training.

A microscope image 25 to be processed is input into the ordinal classification model M in a process S5 and, in a process S6, each classifier C1-C255 calculates a classification mask K1-K255 for this microscope image 25.

In a process S7, the classification masks K1-K255 calculated by the classifiers C1-C255 for the same microscope image 25 are combined into a result image 60. Combining the classification masks K1-K255 can occur by means of a summation. The values of locally corresponding pixels of the classification masks K1-K255 are added together. For example, if the classification masks K1 to K80 indicate a value of 1 for a pixel of the image coordinates (x, y) (illustrated in FIG. 3 as a black pixel) while the pixel of these image coordinates (x, y) has a value of 0 in all other classification masks, then the sum yields a value or grey value of 80. The summation thus allows a greyscale image to be generated from a plurality of binary masks. The number of different shades of grey can correspond to the number of binary masks or be 1 larger than the number of binary masks.

The ordinal classification model M can be designed so that each classifier outputs pixelwise classification probabilities instead of a yes/no classification. The classification probabilities can lie in the range 0 to 1, wherein 1 indicates a certain class membership (corresponding to a black pixel in FIG. 3). Combining the classification masks K1-K255 can occur by means of a pixelwise summation in this case as well. In principle, this makes it possible to achieve more precise results than through the summation of binary 0/1 classification results.

Summation is an example of an implementation of a common/shared decision based on the classification masks K1-K255. It is instead also possible to determine for each pixel the classification mask K1-K255 with the largest pixel threshold value that indicates a class membership or a classification probability greater than 50% for this pixel and to use the pixel threshold value of this classification mask as the pixel value in the result image 60. If, e.g., the classification masks K1-K112 indicate a class membership for a certain pixel (black pixel in FIG. 3) while the following classification masks in the order up to K255 do not indicate a class membership for this pixel (white pixel in the figure), then the pixel threshold value 112 of the classification mask K112 is used as the grey value/pixel value for the corresponding pixel in the result image 60.
FIGS. 4 to 6

The classification masks calculated by the classifiers in the inference phase can be analysed with regard to a consistency. In the event of logical contradictions between the classification masks, it is possible to infer a low confidence. The classification masks can be analysed pixelwise, wherein a pixel with the same image coordinates is respectively considered from each classification mask: in the event of logical contradictions between these pixel values (classification estimates), a low confidence can be inferred for the locally corresponding pixel in the result image. A confidence can be calculated for each pixel of the result image in this manner.

FIGS. 4, 5 and 6 respectively show an example of the pixel values or classification estimates S of the classifiers for a particular pixel. In the illustrated cases, 19 classifiers C1-C19 are used. The figures respectively show a graph with the classification probabilities/classification estimates S of the classifiers C1-C19 for a pixel of their respective classification mask. A pixel with the same image coordinates is considered from each classification mask, for example always the first pixel at the top left of each classification mask. A curve V of the classification estimates S over the series of classifiers C1-C19 provides information on the reliability of the classification estimates S and thus of the pixel value calculated therefrom in the result image. The classifiers C1-C19 can have been trained analogously to the example of FIG. 2, whereby a classifier Ci estimates the probability of a class membership according to which a pixel value in the result image should be $\geq$i. In the example of FIGS. 4-6, i runs from 1 to 19. FIG. 4 shows an ideal curve V, which has a monotonic slope and a sigmoid form with a sharply dropping edge F. The examples of FIGS. 5 and 6, on the other hand, show logical contradictions in the classification estimates S. In the case of FIG. 6, for example the classification estimate of the classifier C4 (which indicates the probability that the pixel value is $\geq$4) is greater than the classification estimate of the classifier C1 (according to which the pixel value should be $\geq$1). Such contradictions indicate a low confidence. A measure of confidence can be calculated in the form of, e.g., a deviation of the classification estimates S from a monotonic curve. Alternatively, a sigmoidal function can be fitted to the curve V and the fit error used as a measure of confidence. It is also possible to determine the point symmetry in relation to a center point of an edge F in the curve V. In the example of FIG. 4, this center point lies at the classifier C10. The more the curve V deviates from a point symmetry, the lower the confidence is. It is alternatively or additionally possible for an edge width Fw, i.e. the width of the edge F in the sigmoidal curve V (see FIG. 4), to be determined as a confidence measure. The pixel threshold values of the classifiers that form the start and end of the edge F respectively constitute the lower limit and the upper limit of a precision of the pixel value of the result image. In the example of FIG. 4, the edge F starts at the classifier C9 (with a pixel threshold value 9) and ends at the classifier C11 (with a pixel threshold 11), so that the interval 9-11 can be indicated as a precision for the pixel value. The pixel value itself can be determined as the sum of the classification estimates S, which in the example of FIG. 4 yields approximately 10.

FIG. 7

Figure 7:
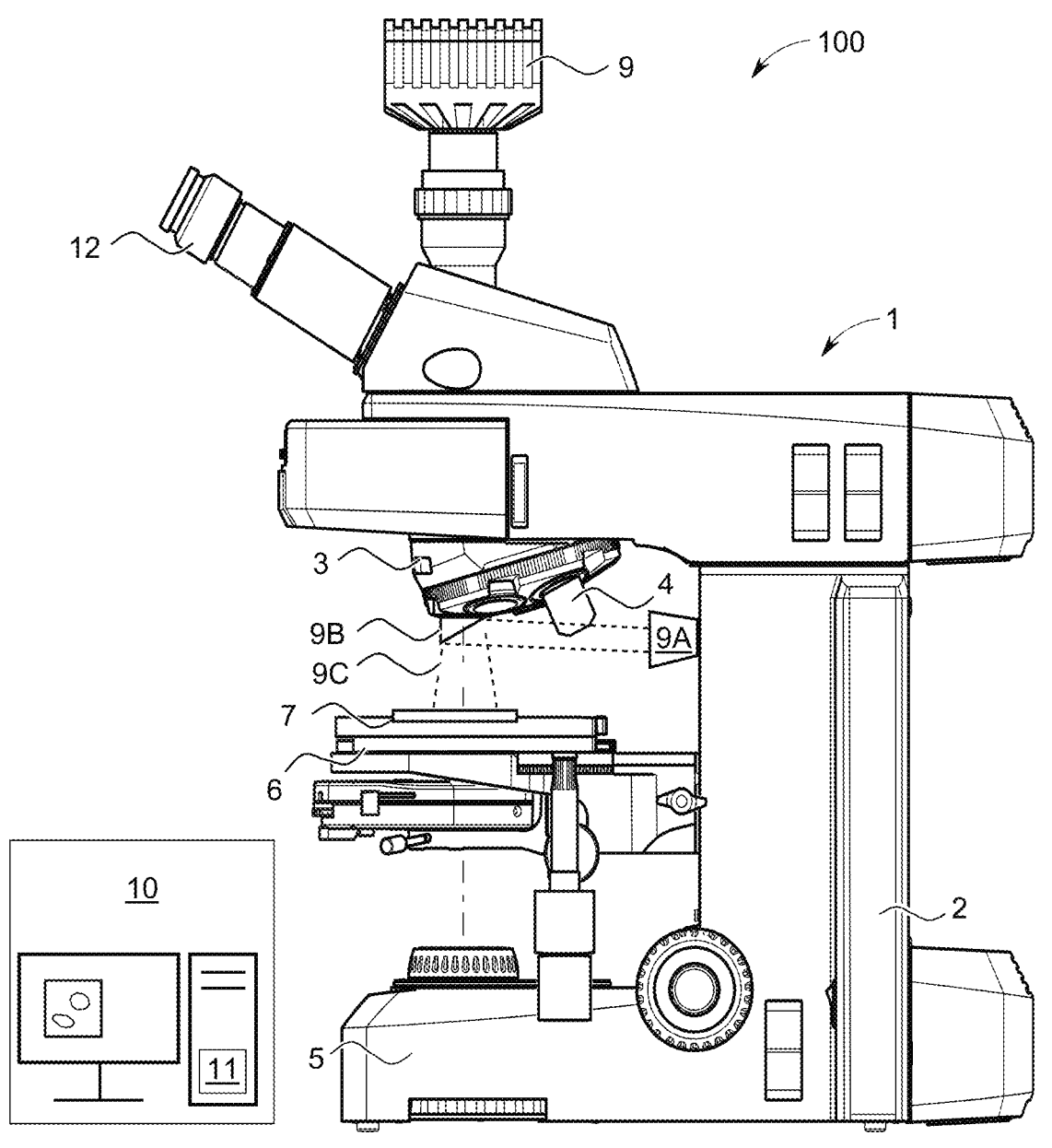
FIG. 7 schematically shows an example embodiment of a microscopy system of the invention.

FIG. 7 shows an example embodiment of a microscopy system 100 according to the invention. The microscopy system 100 comprises a computing device 10 and a microscope 1, which is a light microscope in the illustrated example, but which in principle can be any type of microscope. The microscope 1 comprises a stand 2 via which further microscope components are supported. The latter can in particular include: an illumination device 5; an objective changer/revolver 3, on which an objective 4 is mounted in the illustrated example; a sample stage 6 with a holding frame for holding a sample carrier 7; and a microscope camera 9. When the objective 4 is pivoted into the light path of the microscope, the microscope camera 9 receives detection light from an area in which a sample can be located in order to capture a sample image. A sample can be any object, fluid or structure. It is also possible to use an eyepiece 12 in addition to or instead of the microscope camera 9. The microscope 1 optionally comprises an additional overview camera 9A for capturing an overview image of a sample carrier 7. A field of view 9C of the overview camera 9A is larger than a field of view of the microscope camera 9. In the illustrated example, the overview camera 9A views the sample carrier 7 via a mirror 9B. The mirror 9B is arranged on the objective revolver 3 and can be selected instead of the objective 4.

A microscope image is understood in the present disclosure as raw image data captured by the microscope or as data processed from the same. The microscope image can in particular be an overview image of the overview camera 9A or a sample image of the sample camera/system camera 9. Captured microscope images can be utilized for the above-described variants of the method according to the invention, either in the training of the model or in the inference phase after completion of the training. The target images provided for the model training can also be images captured by the microscope 1 or images extracted from the same. The method can be carried out by a computer program 11 that forms part of the computing device 10.

Variations of the Described Examples

The described characteristics of example embodiments can be combined with one another and can in particular be modified as described in the following.

The combination of the classification masks K1-K255 in process S7 described with reference to FIG. 3 can also be implemented by a machine-learned model (combination model in the following). The classification masks K1-K255 calculated for a predetermined microscope image 20 of the training data of the ordinal classification model M are input into the combination model in the training. The target image Z is used as a target/ground truth in the training of the combination model. The combination model can in particular have a single-layer design and calculate, e.g., solely a linear combination of the classification masks K1-K255. A training of the combination model can occur simultaneously with or after the training of the ordinal classification model M. The combination model and the ordinal classification model M can be concatenated to form an overall model, so that only result images 60 and no classification masks K1-K255 are explicitly output when the overall model is in use.

In FIG. 2, binary masks Z1-Z255 are first generated from a target image Z in a separate process and then used in the loss function L. It is instead also possible to calculate the binary masks Z1-Z255 from the target image Z first within the loss function L. In this case, the comparison with pixel threshold values in order to assign a class membership occurs first within the loss function L. The result of the loss function remains unaltered by this modification, as the discrepancies in relation to the class memberships as indicated in the binary masks are still captured. In this modification, the binary masks Z1-Z255 do not have to be explicitly output or saved.

The number of pixel threshold values for forming binary masks is equal to the number of classifiers and thus equal to the number of classification masks calculated by the ordinal classification model for an input microscope image. The number of possible pixel values in the result image formed from the classification masks can be equal to the number of pixel threshold values or 1 greater. In particular in the case of a pixelwise summation of the classification probabilities of different classification masks, however, it is possible to achieve an increased precision that corresponds to a finer gradation than the distances between the pixel threshold values. The number of possible pixel values in the result image can thus also be considerably higher, e.g. at least twice as high as the number of pixel threshold values. A step size between the pixel threshold values can respectively be 1 (e.g., the pixel threshold values can be 1; 2; 3; . . . 255) or any larger value; with a step size of 2, e.g., it is possible to form the pixel threshold values 2; 4; 6; . . . 256.

A sum or generally a combination of the pixel values of the classification masks can be mapped to another value range. If, e.g., the pixelwise sum of 128 classification masks is calculated, the sum lies in the interval 0 to 128. For example, this sum can be mapped to the interval 0 to 256 by multiplication by the factor 2, which renders possible a full exploitation of an 8-bit color depth. By mapping the sum to a larger range of numbers, it is also possible for decimal numbers resulting from the sum of classification probabilities to be mapped to different pixel values. In the example cited above, e.g., the sums 4.1 and 4.4 can be mapped to the rounded pixel values 8 and 9 by multiplication by 2.

The pixel threshold values do not have to have an equidistant step size relative to one another. Rather, for example, a distance between successive pixel threshold values P can increase as the pixel threshold value increases, in particular exponentially along the lines $2^P$, i.e.: 2; 4; 8; 16; 32; etc. If a high pixel value stands for a high amount of received light, this allows a relatively high sensitivity for both low and high detection light intensities to be provided with a reduced number of classifiers. A sum of the pixel values of locally corresponding pixels of the classification masks is mapped to a pixel value range for the result image in a manner analogous to the formation of the pixel threshold values; in the foregoing example, the sum s is mapped to a pixel value according to 2s+0,5. For example, there can be a sum s=4.5 for a pixel if the classifiers for the threshold values 2; 4; 8 and 16 indicate a probability of class membership of 1, the classifier for the threshold value 32 indicates a probability of 0.5, and all other classifiers indicate a probability of 0. The sum s=4.5 is mapped to the pixel value 2s+0,5=32.

The described example embodiments are purely illustrative and variants of the same are possible within the scope of the attached claims.

LIST OF REFERENCE SIGNS

1 Microscope
2 Stand
3 Objective revolver
4 (Microscope) objective
5 Illumination device
6 Sample stage/microscope stage
7 Sample carrier
9 Microscope camera
9A Overview camera
9B Mirror
9C Field of view of the overview camera
10 Computing device
11 Computer program
12 Eyepiece
20 Predetermined microscope image for the training
21 Image regions of samples, e.g. biological cells 25 Microscope image/microscope image to be processed
60 60' Result image
100 Microscopy system
C1-C255 Classifiers
F Edge in the curve of the classification estimates of the classifiers for a certain pixel
Fw Width of the edge F
K1-K255 Classification masks calculated by the classifiers C1-C255 from an input microscope image 20, 25
L, L' Objective function/loss function
M Ordinal classification model
M' Regression model of the prior art
M1 First network section of the model M or M'
M_out Multi-channel output of the first network section
P1-P255 Pixel threshold values
S Classification estimates of the classifiers for a certain pixel
S1-S7 Processes of an example method of the invention
T1-T255 Classification targets for the training of the classifiers C1-C255
V Curve of the classification estimates of the classifiers for a certain pixel
Z Target image for a predetermined microscope image
Z1-Z255 Binary masks generated from a target image

What is claimed is:

1. A microscopy system for forming a result image from a microscope image using an ordinal classification model,
wherein the microscopy system comprises a microscope for capturing a microscope image to be processed and a computing device for processing the microscope image;
wherein the computing device includes an ordinal classification model that comprises a plurality of classifiers and that is defined by a training designed as follows:
predetermined microscope images are input into the ordinal classification model in the training;
a target image is given for each predetermined microscope image, wherein a plurality of binary masks are generated from each target image via a comparison with different pixel threshold values;
the binary masks generated from the target images by means of the same pixel threshold value are used in the training as classification targets of one of the classifiers, whereby the training of different classifiers differs in the pixel threshold value that is used to generate the associated classification targets;
wherein, in the training of one of the classifiers, discrepancies between classification masks calculated by the classifier from predetermined microscope images and the binary masks used as classification targets are reduced;
wherein the computing device is configured to input a microscope image to be processed into the ordinal classification model after completion of the training,
wherein each classifier calculates a classification mask for the input microscope image;
wherein the computing device is configured to combine the classification masks calculated by the classifiers for the same microscope image to be processed into a result image.

2. A computer-implemented method for calculating a result image from a microscope image using an ordinal classification model,
wherein the ordinal classification model comprises a plurality of classifiers and is defined through a training designed as follows:

predetermined microscope images are input into the ordinal classification model in the training;

a target image is given for each predetermined microscope image, wherein a plurality of binary masks are generated from each target image via a comparison with different pixel threshold values;

the binary masks generated from the target images by means of the same pixel threshold are used in the training as classification targets of one of the classifiers, whereby the training of different classifiers differs in the pixel threshold value that is used to generate the associated classification targets;

wherein, in the training of one of the classifiers, discrepancies between classification masks calculated by the classifier from predetermined microscope images and the binary masks used as classification targets are reduced;

wherein, after completion of the training, a microscope image to be processed is input into the ordinal classification model and each classifier calculates a classification mask for this microscope image;

wherein the classification masks calculated by the classifiers for the same microscope image to be processed are combined into a result image.

3. The method according to claim 2, wherein the ordinal classification model comprises a first network section with a convolutional neural network, wherein the microscope image to be processed is input into the first network section, which calculates a multi-channel output therefrom;

wherein the multi-channel output of the first network section is input into each of the classifiers, which calculate the classification masks therefrom.

4. The method according to claim 3, wherein each classifier is designed to calculate a linear combination from the multi-channel output of the first network section in order to form the classification mask; and wherein the classifiers differ after the training in how the respective linear combination is formed.

5. The method according to claim 2, wherein solely the binary masks generated from the target images, and not the target images themselves, are used in the training of the ordinal classification model.

6. The method according to claim 2, wherein the classification masks calculated by the classifiers are binary masks or indicate a classification probability pixelwise.

7. The method according to claim 2, wherein each target image is a greyscale image, from which the different binary masks are formed via the comparison with the different pixel threshold values, and wherein the result image calculated from the classification masks of the classifiers is a greyscale image.

8. The method according to claim 2, wherein each target image comprises one or more channels, wherein a plurality of binary masks are generated for each channel via a comparison with pixel threshold values and classifiers of the ordinal classification model are trained with the generated plurality of binary masks.

9. The method according to claim 2, wherein an objective function that captures the discrepancies between the classification masks and the binary masks is optimized in the training, wherein the binary masks are calculated from the target images within the objective function.

10. The method according to claim 2, wherein a weighting mask is calculated for each binary mask, wherein a weight in the weighting mask is greater, the further away a pixel value of the target image from which the binary mask was calculated is from the pixel threshold value used to calculate the binary mask, wherein the discrepancies between the classification masks and the binary masks are weighted in the training by the weighting masks.

11. The method according to claim 2, wherein the classification masks calculated by the classifiers for the same microscope image are added pixelwise in order to form the result image.

12. The method according to claim 2, wherein a machine-learned model is used to calculate the result image from the classification masks, to which end training data of the machine-learned model comprises input images in the form of the classification masks calculated by the ordinal classification model from one of the predetermined microscope images and the target image associated with this predetermined microscope image is used as a training target of the machine-learned model.

13. The method according to claim 2, wherein the result image takes the form of one or more of the following:

a result image in which depicted objects are more clearly visible or are depicted in a higher image quality or in which a depiction of certain structures is suppressed;

a virtually stained image, to which end the predetermined microscope images of the training are captured with a different contrast type than the target images;

a resolution enhancement of the microscope image to be processed, to which end the target images have a higher resolution than the predetermined microscope images in the training;

a denoising of the microscope image to be processed;

a result image in which sample regions that were not captured in the microscope image to be processed are added based on neighboring captured sample regions in the microscope image to be processed;

a deconvolution of the microscope image to be processed, to which end the target images are a deconvolved version of the predetermined microscope images.

14. The method according to claim 2, wherein a number of pixel thresholds and thus a number of binary masks generated from the same target image lies between 2 and 16, whereby result images calculated from the classification masks of the ordinal classification model are reduced in detail compared to the target images.

15. The method according to claim 2, wherein the target images are semantic segmentations with three or more ordinal classes, wherein pixel values of the target images indicate a membership in the ordinal classes.

16. The method according to claim 15, wherein the ordinal classes designate a defocus, a noise level, a degree of contamination, a sample-vessel fill level or object sizes.

17. The method according to claim 2, wherein a confidence is calculated for each pixel in the result image, wherein the confidence indicates a reliability of a pixel value of the respective pixel in the result image;

wherein the confidence of a pixel in the result image is calculated based on a consistency of classification estimates for that pixel in the classification masks.

18. The method according to claim 17, wherein the confidence for a pixel value is determined to be lower, the more pronounced contradictions are between the classification estimates of the classifiers for the pixel in question; or wherein the classification estimates of the classifiers for a pixel form a series according to the associated pixel threshold values; wherein a curve of the series of classification estimates for a pixel is analyzed and the confidence for this pixel is determined to be lower, the more the curve deviates from a monotonic curve or the more the curve deviates from a point-symmetric curve or the more the curve deviates from a sigmoid function or the higher an entropy of the curve is.

19. A computer program, comprising commands that are stored on a non-transitory computer-readable medium and that cause, when the program is executed by a computer, the computer to carry out the method according to claim 2.

20. A microscopy system comprising:

a microscope for capturing a microscope image to be processed;

at least one computing device for processing the microscope image; and an ordinal classification model stored on the at least one computing device, wherein the ordinal classification model comprises a plurality of classifiers and is defined by a training designed as follows:

predetermined microscope images are input into the ordinal classification model in the training;

a target image is given for each predetermined microscope image, wherein a plurality of binary masks are generated from each target image via a comparison with different pixel threshold values;

binary masks generated from the target images using the same pixel threshold value are used in the training as classification targets of one of the classifiers, whereby the training of different classifiers differs in the pixel threshold value that is used to generate the associated classification targets;

wherein, in the training of one of the classifiers, discrepancies between classification masks calculated by the classifier from the predetermined microscope images and the binary masks used as classification targets are reduced; and wherein the at least one computing device is configured to:

input a microscope image to be processed into the ordinal classification model after completion of the training, wherein each classifier calculates a classification mask for the input microscope image; and combine the classification masks calculated by the classifiers for the same microscope image to be processed into a result image.

* * * * *